United States Patent [19]
Jonsson

[11] 4,029,231
[45] June 14, 1977

[54] PILFERPROOF CLOSURE FOR BOTTLES, TUBES AND SIMILAR CONTAINERS

[75] Inventor: Knut Johan Vilhelm Jonsson, Kungalv, Sweden

[73] Assignee: AB Wicanders Korkfabriker, Alvangen, Sweden

[22] Filed: Nov. 20, 1975

[21] Appl. No.: 633,788

[30] Foreign Application Priority Data

Nov. 21, 1974 Sweden .......................... 7414621
May 9, 1975 Sweden .......................... 7505380

[52] U.S. Cl. .................... 215/256; 215/224; 222/153; 222/182; 220/270; 220/85 P; 220/306
[51] Int. Cl.² ........................................ B65D 41/32
[58] Field of Search ................. 215/9, 7, 216, 224, 215/251, 256, 258, 254; 222/182, 541, 153; 220/257, 258, 220, 85 P, 306

[56] References Cited
UNITED STATES PATENTS

| 3,170,602 | 2/1965 | Sullentrop et al. | 220/85 P |
| 3,474,930 | 10/1969 | Lerner | 222/182 X |
| 3,802,607 | 4/1974 | Mead | 222/182 |
| 3,820,683 | 6/1974 | Jansinski | 215/9 X |
| 3,854,622 | 12/1974 | McKirnan | 215/216 X |
| 3,884,393 | 5/1975 | Wassilieff | 220/270 X |

*Primary Examiner* — George T. Hall

[57] ABSTRACT

A pilferproof closure is disclosed having an inner cap and an outer cap. The inner cap is joined together with the outer cap and thus the closure is not removable from a container before the connection between the inner cap and the outer cap has been broken. Inwardly directed projections are provided on said inner cap and arranged to be brought into engagement with the neck of the container to form a childproof reusable closure after the original closure has been broken.

7 Claims, 8 Drawing Figures

PILFERPROOF CLOSURE FOR BOTTLES, TUBES AND SIMILAR CONTAINERS

The invention relates to pilferproof closures for bottles, tubes and similar containers and more particularly to spray bottles, comprising a protective cap which can be reused for repeatedly sealing the opening of the container.

BACKGROUND OF THE INVENTION

Many different types of products such as hair preparations, anti-corrosives, paints, weed-killers, medicines, etc. are nowadays distributed in spray bottles. Such bottles include a spray valve arranged at the top of the container as well as a safety cap protecting said valve during transport and between each use of the package by the consumer. Thus said safety cap could be easily removed from the neck of the container and, after use, be replaced over the spray valve.

A primary drawback of known protective covers is that they at any time can be intentionally or unintentionally removed from the container and thereafter replaced, which means that a consumer buying such a package has no guarantee that the container is filled in an adequat manner.

Another drawback with these known protective covers is that they are not child-proof, which is extremely inconvenient.

SUMMARY OF THE INVENTION

It is one object of the present invention to provide a pilferproof original closure for such containers which is simple to operate and inexpensive to manufacture.

Another object of the invention is to provide a pilferproof closure, which once being broken, is usable as a child-proof protective cover. These and other objects have been achieved by the present invention which includes a pilferproof closure comprising an inner cap and an outer cap, in which said inner cap and at least a part of said outer cap are detachably joined together and said inner cap is provided with inwardly directed locking means detachably engaging the nozzles bulge of the container.

In this way there is provided a guaranteed original pilferproof closure which cannot be removed unnoticed since the inner and outer caps are joined together and the inner cap is in engagement with the bulge around the opening of the container. The firm connection is then automatically broken in the consumer stage, after which the inner cap remains as a childproof closure.

According to a preferred embodiment of the invention the detachable connection between the outer and inner caps consists of a tear-off strip defined by enervation lines spaced for each other.

Other features, objects and advantages of the invention will be revealed in the following description and the claims.

DESCRIPTIONS OF THE DRAWINGS

For a further understanding of the present invention reference may be had to accompanying drawings, in which.

Figure 1:
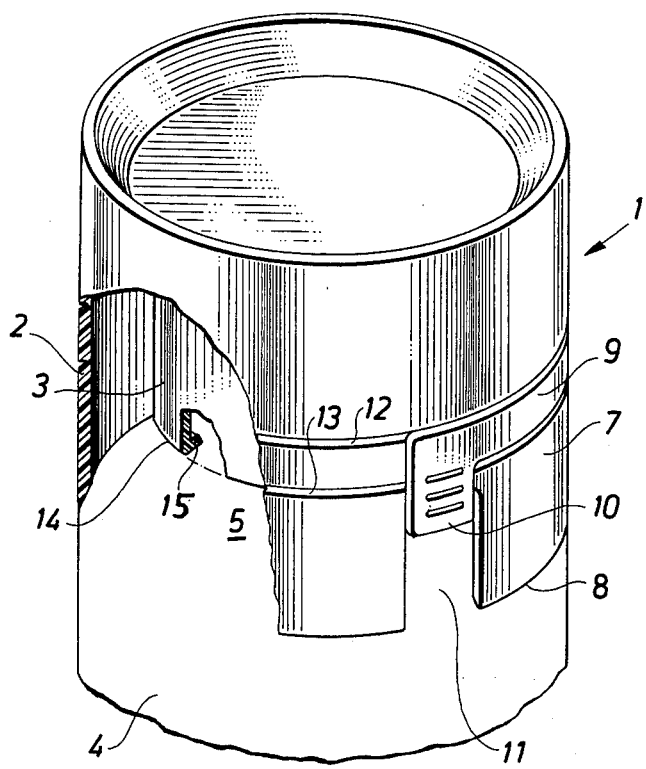
FIG. 1 is a view of a first embodiment of the invention.
Figure 2:
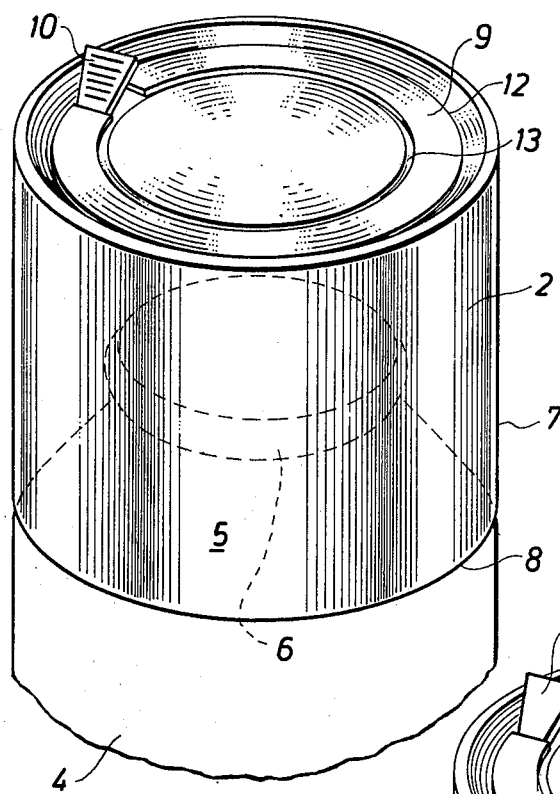
FIG. 2 is a view of a second embodiment of the invention.
Figure 3:
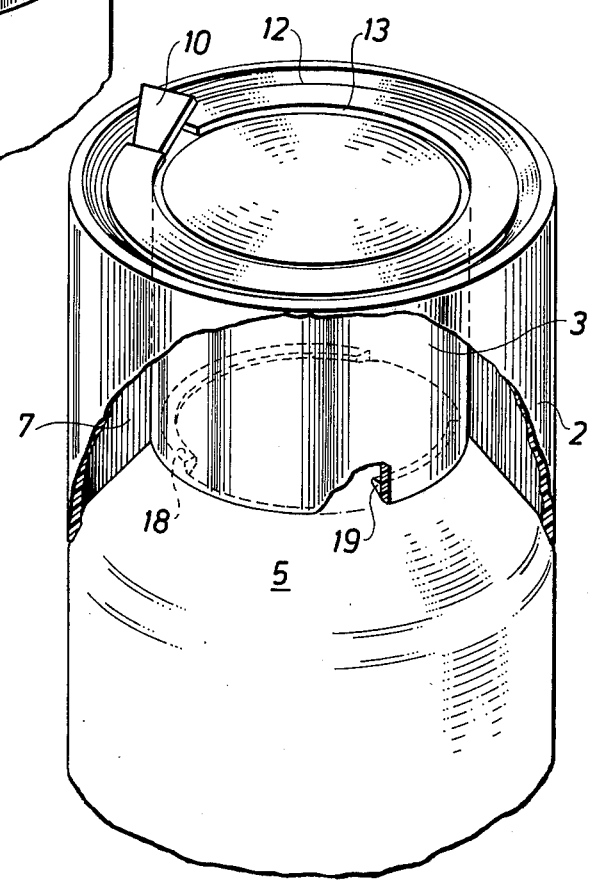
FIG. 3 shows the arrangement of FIG. 2 partially in section.
Figure 4:
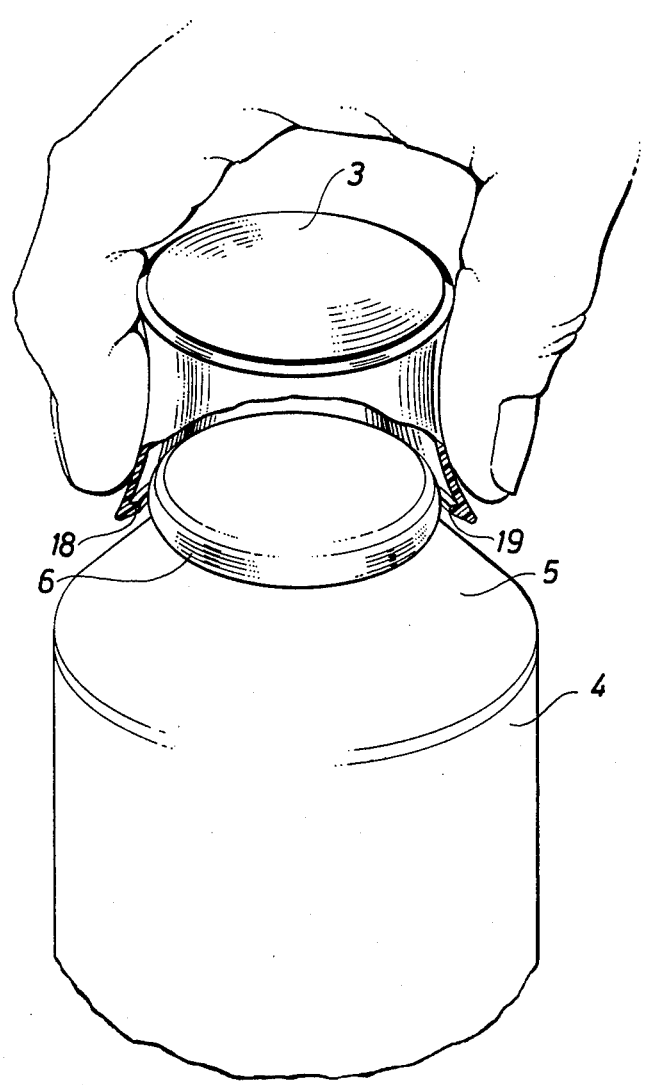
Figure 5:
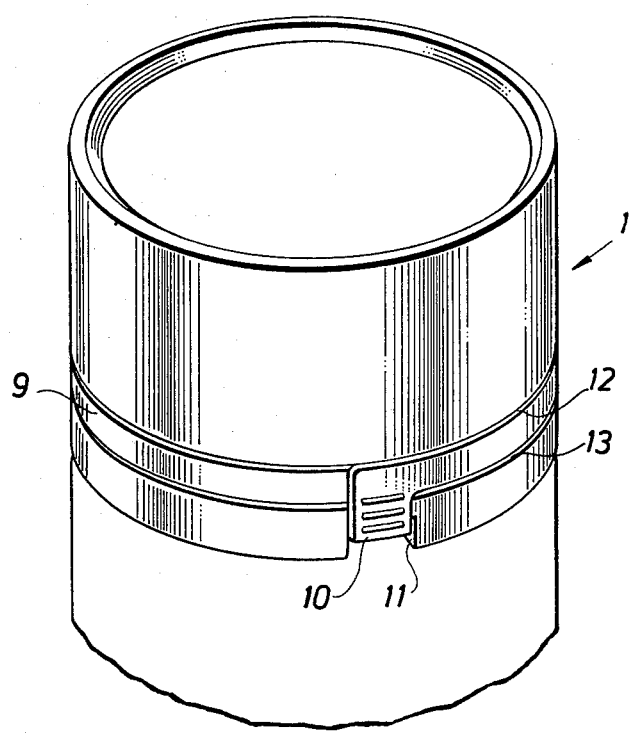
Figure 6:
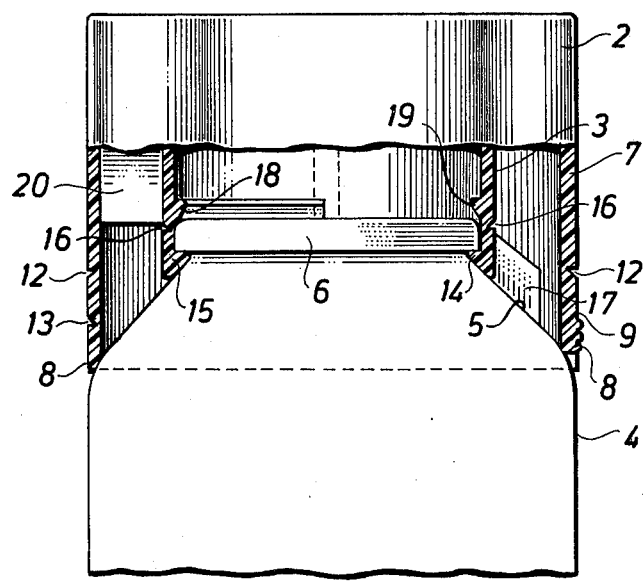
Figure 7:
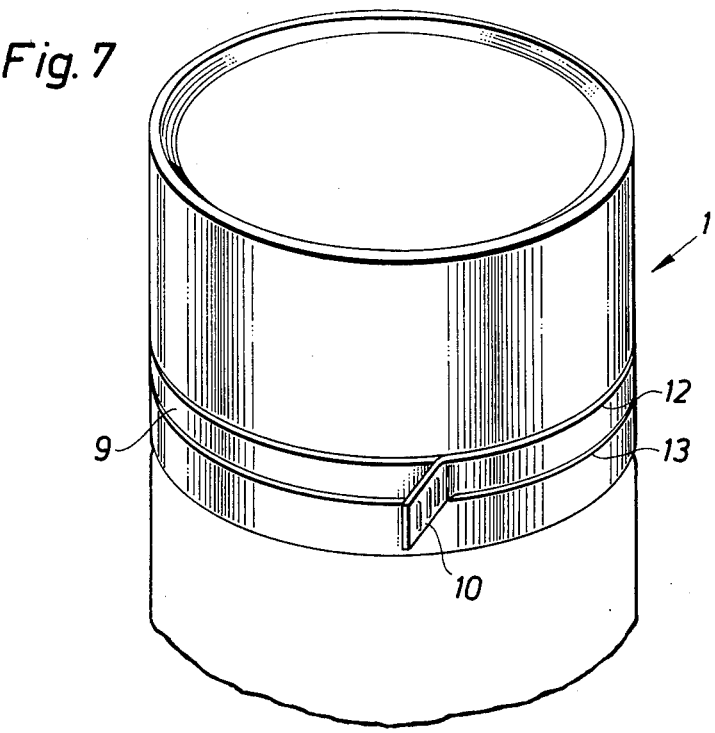
Figure 8:
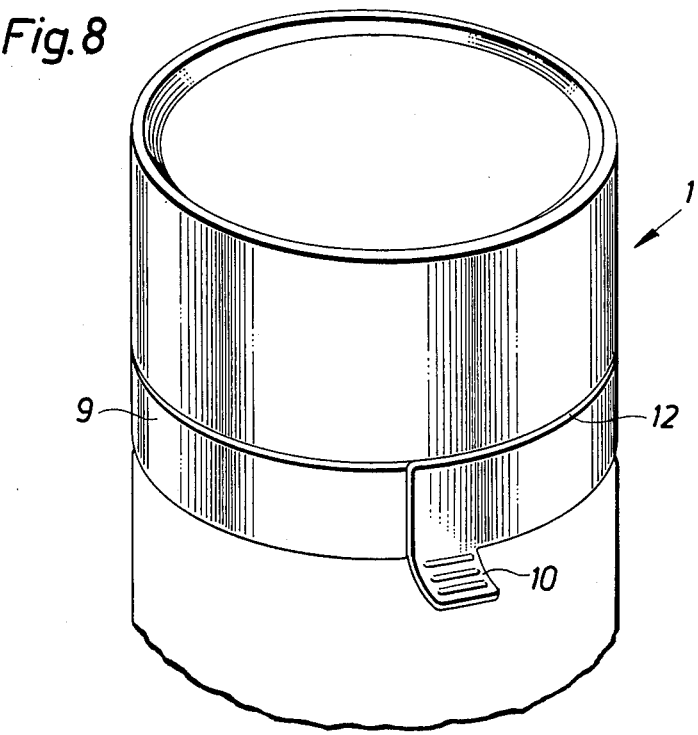

FIG. 4 is a view - partially in section - of the inner cap shown in the arrangements in FIGS. 1 to 3, upon its removal, FIG. 5 is a perspective view of a third embodiment of a closure according to the invention, FIG. 6 shows a section through the arrangement shown in FIG. 5, FIG. 7 is a perspective view of a fourth embodiment of a closure according to the invention, and FIG. 8 is a perspective view of a fifth embodiment of a closure according to the invention.

BRIEF DESCRIPTION OF THE PREFERRED EMBODIMENTS

Referring now to the drawings the protective cover 1 comprises an outer cap 2 and an inner cap 3 and is arranged on the neck 5 of a container 4 having a bulge 6 around the opening. When the protective cover 1 is in its fixed position, the skirt 7 of the outer cap 2 rests with its lower edge 8 on the neck 5 of the container in such a way that the skirt 7 forms a natural extension of the outer casing of the container 1. A tear-off strip 9 is formed into the outer skirt 7 and is extending around the skirt and comprises a downwardly directed flap 10, which is located in a corresponding notch 11 in the edge 8. The tearoff strip 9 has thus been formed by two enervation lines 12, 13 running around the outer skirt 7 and being spaced from each other.

The lower, free edge 14 of the inner cap 3 is provided with two inner projections 15, 16 located diametrically opposite each other.

In the alternative embodiment of the invention shown in FIGS. 2 and 3, the protective cover 1 also comprises an outer and an inner cap 2 and 3, respectively. The tear-off strip 9, however, is arranged in the upper side of the cap 3 so that the inner limit 13 of the strip 9 is torn off around the upper edge of the inner cap 3.

The protective cover 1 shown in FIGS. 1 to 3 thus serves initially as an original pilferproof closure and prevents intentional opening of the package.

When the opening of the container is to be exposed by the consumer, the flap 10 is lifted, after which the tear-off strip 9 is pulled off around the lid. In this way the inner cap 3 is exposed and serves thereafter as a childproof reusable closure. Thus the inner cap 3 cannot be removed unless a combined depressing and lifting movement is used, see FIG. 4, i.e. a combination of movement must be performed which, experience has shown, is difficult for small children.

For the sake of simplicity the spray valve itself has not been shown in the drawings.

According to FIGS. 5 and 6 a tear-off strip 9 is provided in the outer skirt 7, spaced from the lower edge 8 and extending around the skirt to finish in a downwardly directed flap 10, which is located in a corresponding notch 11 in the edge 8. The tear-off strip 9 is thus formed by two enervation lines 12, 13, spaced from each other, running around the outer skirt 7.

The lower, free edge 14 of the inner cap 3 is provided with an inwardly projecting flange 15 which is in engagement with the bulge 6 of the opening. Spaced from the free edge 15 of the inner cap 3 is an enervation line 16 running around the inner cap 3. There is also a permanent connection 17 between the inner surface of the tear-off strip 9, spaced from the pulling flap and the lower skirt surface of the inner cap 3, i.e. between the lower edge 15 of the inner cap 3 and the enervation line 16. Immediately above the enervation line 16 the inner cap 3 is provided with two inner projections 18, 19 located diametrically opposite each other, as well as a number of spacers 20 being arranged between the skirt surfaces of the inner and outer caps, these spacers 20 being permanently joined to the skirt surface 7 of the outer cap 2.

The protective top 1 shown in FIGS. 5 and 6 thus serves initially as an original pilferproof closure and prevents intentional opening of the package.

When the container opening is to be exposed by the consumer, the flap 10 is lifted and the tear-off strip 9 then pulled off around the top. Since the strip 9 is firmly joined by the intermediate piece 17 to the lower skirt part of the inner cap 3, this part will also be pulled off at the same time. The inner cap 3 is thus exposed and can then easily be used to re-close the opening of the container, its inner projections 18, 19 being pressed over the opening bulge 6 and thus brought into engagement beneath this. It should be noted that this re-closure will be child-proof due to the arrangement of the inner projections 18, 19, since the inner cap 3 cannot be removed without a combined depressing and lifting movement, i.e. a combination of movement which, it has been found by experience, is difficult for a child to perform.

In the embodiment of the invention shown in FIG. 7 - which is priniciple is the same as that shown in FIG. 1 - the notch 11 has been omitted, i.e. the flap 10 constitutes an extension of the strip 9 and is located within the grooves 12 and 13.

With the alternative embodiment shown in FIG. 8 the groove 13 has been omitted. In this embodiment, therefore, the lower part of the outer cap is simply torn off along the groove 12.

The embodiments of the invention shown in the drawings may of course be varied in many ways within the scope of the following claims, If the invention is not being used for spray bottles, of course the outer and inner caps need not be of the height specified since the spray valve need not be housed in the inner cap. The inner cap may then be made considerably lower instead and be shaped as a snap-on lid of conventional design.

What is claimed:

1. A pilferproof closure for bottles, tubes and similar containers, having an opening at its top surrounded by a retaining rim, comprising a cap having an inner skirt adapted for repeated sealing of the opening provided with inwardly directed projections to engage with said retaining rim, an outer skirt surrounding said inner skirt and adapted to extend about said inner skirt when said cap is initially closed on said container to prevent movement of said inner skirt permitting the disengagement of said projections with said rim, said inner and outer skirts being provided with detachable sections along the free edges thereof, means for permanently connecting said detachable sections, and an enervation line at a distance from the free edge of the inner skirt arranged to permit said detachable section to be torn from the inner skirt on detachment of the outer skirt.

2. The closure of claim 1 wherein the lower edge of the outer skirt rests against the neck of the container to form a natural extension of the outer casing of the container.

3. The closure of claim 1, wherein said connecting means comprises a plurality of spacers arranged between the outer skirt and the inner skirt, said spacers being permanently connected to said outer skirt to maintain separation of said skirt.

4. The closure of claim 1, wherein said detachable section of said outer skirt is integral with said outer skirt and defined by an enervation line arranged at a distance from the free edge of said outer skirt.

5. The closure of claim 1, wherein said detachable section arranged in said outer skirt consists of a tear-off strip attached to said outer skirt defined by two enervation lines spaced from each other.

6. The closure of claim 1, wherein the detachable section is formed in the outer skirt and extends around the skirt, and is provided with a flap for gripping.

7. The closure according to claim 1 including a second set of projections arranged above said detachable section within said inner skirt, enabling said cap to be reclosed upon said container after removal of said detachable section.

* * * * *